United States Patent
Wang

(10) Patent No.: US 9,198,406 B2
(45) Date of Patent: Dec. 1, 2015

(54) FISHING LINE SPOOL ASSEMBLY

(71) Applicant: Xiaomei Wang, Jiangmen (CN)

(72) Inventor: Xiaomei Wang, Jiangmen (CN)

(*) Notice: Subject to any disclaimer, the term of this patent is extended or adjusted under 35 U.S.C. 154(b) by 0 days.

(21) Appl. No.: 14/360,574

(22) PCT Filed: Jan. 9, 2014

(86) PCT No.: PCT/CN2014/070417
§ 371 (c)(1),
(2) Date: May 23, 2014

(87) PCT Pub. No.: WO2015/096218
PCT Pub. Date: Jul. 2, 2015

(65) Prior Publication Data
US 2015/0173335 A1 Jun. 25, 2015

(30) Foreign Application Priority Data
Dec. 25, 2013 (CN) .................. 2013 2 0875516 U

(51) Int. Cl.
*A01K 89/01* (2006.01)
*A01K 89/00* (2006.01)
(52) U.S. Cl.
CPC .................................. *A01K 89/003* (2013.01)
(58) Field of Classification Search
CPC .................................................... A01K 89/003
USPC ..................... 242/396.9, 396.7, 323; 43/25
See application file for complete search history.

(56) References Cited

U.S. PATENT DOCUMENTS

| | | | | |
|---|---|---|---|---|
| 2,993,661 A * | 7/1961 | Arrigo | .................. | 242/423.2 |
| 3,950,881 A * | 4/1976 | Hays | .................. | 43/25 |
| 3,951,354 A * | 4/1976 | Bagby | .................. | 242/129.8 |
| 4,773,612 A * | 9/1988 | Futrell, II | .................. | 242/396.1 |
| 5,029,409 A * | 7/1991 | Nouwens | .................. | 43/25 |
| D355,471 S * | 2/1995 | Karr et al. | .................. | D22/134 |
| 5,513,463 A * | 5/1996 | Drinkwater | .................. | 43/25 |
| D456,483 S * | 4/2002 | Cryer et al. | .................. | D22/134 |
| 6,609,673 B1 * | 8/2003 | Johnson | .................. | 242/423.1 |
| 6,640,484 B1 * | 11/2003 | Russow | .................. | 43/25 |
| 6,671,993 B1 * | 1/2004 | Routt | .................. | 43/4.5 |
| 6,742,737 B1 * | 6/2004 | Conner | .................. | 242/323 |
| 7,841,553 B2 * | 11/2010 | Touchstone | .................. | 242/129.8 |
| 2010/0012763 A1 * | 1/2010 | Boardman | .................. | 242/423.2 |

* cited by examiner

*Primary Examiner* — Emmanuel M Marcelo
(74) *Attorney, Agent, or Firm* — PROI Intellectual Property US

(57) ABSTRACT

A fishing line spool assembly includes an open body frame, wherein a fishing line spool is mounted between two side plates of the body frame at an open end, has a central bore, and is rotatably sandwiched between the two side plates by a clamping adjustable device inserted through the central bore of the fishing line spool and bores of the two side plates. The body frame is provided with a connection device for connecting to a fishing rod. The clamping force applied on the fishing line spool by the two side plates can by adjusted by the clamping adjustable device. When the fishing line in the fishing line spool is drawn by a fishing reel, the clamping force on the fishing line spool by the body frame will function as a brake against the rotation of the fishing line spool.

4 Claims, 3 Drawing Sheets

FISHING LINE SPOOL ASSEMBLY

CROSS REFERENCE TO RELATED APPLICATIONS

The present application is the US national stage of International Patent Application PCT/CN2014/070417 filed on Jan. 9, 2014, which, in turn, claims priority to Chinese Patent Application CN201320875516.1 filed on Dec. 25, 2013.

FIELD OF THE INVENTION

The present invention relates to a fishing tool, and more particularly, to a fishing line spool assembly.

BACKGROUND OF THE INVENTION

With the increasingly faster of the modern life, more and more people begin to like such a creational activity as fishing to relax. There are many kinds of fishing methods, one of which is throwing fishing rod. In this method, relative long fishing line can be loaded by means of a fishing reel provided on the fishing rod, and a fish bait is threw far away by means of a weight (e.g. plummet or the fish bait) provided at the end of the fishing rod through some force applied thereto in connection with the elasticity of the fishing rod; or when angling in a boat, by using the weight of the plummet, in connection with the winding or unwinding of the fishing line, the angling depth can be controlled. The above mentioned fishing method can enlarge the depth and the range for seeking shoal, and can also select a more comfortable and safer position to fish according to the specific situation of the fishing place, which not only increases the interesting of the fishing, but also avoids the occurrence of the danger and accident. Therefore, the throwing fishing rod method is widely used over the world.

The tool used in fishing generally is a fishing rod, on which a hook(s) and a fishing reel is provided. Before fishing, the fishing line needs to be introduced into a fishing reel to be ready for fishing. But during introducing the line into the fishing reel, the tension on the line must be well controlled. If the tension is too large, the line will be winded tightly and the line will be subjected force over time, so that the line will be deformed to cause the line to be coiled like a spring, which would negatively affect unwinding the line when throwing the line and impair the strength of the line, and thus the line will be broken easily when fishing, resulting in escape of fish or the like; if the tension is too small, loosely winding the line will cause the line at the outer circumference to be caught into the gap of the line at the inner circumference when the line is thrown or receives force, resulting in line twisting or mess upon throwing. When this situation is not very bad, the line may still be smoothed patiently, but if the situation is very bad, the line would have to be cut off, otherwise the line and the fishing reel cannot be operated anymore.

Since the tension should be appropriately controlled when introducing the fishing line into the fishing reel, the conventional winding method generally includes the following two methods, one of which is cooperation by two persons, one person is to operate the fishing reel to wind the line, and the other person will grasp the fishing line spool to control the velocity at which the line is unwound from the fishing line spool, and thus control the tension of the line; the other is one person operation, in which the fishing line spool is placed horizontally on some position, and the winding tension is controlled through pinching the line by one hand, and winding on the fishing reel is achieved by the other hand. In both of the above methods, the tension control is fulfilled manually, so it is difficult to maintain the tension uniformly and thus there is variation in the tightness of the line. In addition, when introducing a line with different material or thickness, the winding tension will also be different, it is even more difficult to the operator to properly control the force applied on the line, and only an experienced person can fulfilled such an operation, otherwise, the introduction of the line cannot be well fulfilled.

SUMMARY OF THE INVENTION

In order to overcome the deficiencies in the prior art, the present invention provides a fishing line spool assembly, by which the introducing the line into the fishing reel is facilitated, the shortcoming of the non-uniform tension on the fishing line in the conventional method is overcome, the line being such introduced has a proper tightness and the operation is easily carried out.

The solution of the present invention to solve the technical problem is:

A fishing line spool assembly, wherein the fishing line spool assembly comprises an open body frame, between two side plates of the body frame, a fishing line spool is mounted at the open end thereof, the fishing line spool has a central bore, and is rotatably sandwiched between the two side plates of the body frame by a clamping adjustable device inserted through the central bore of the fishing line spool and bores of the two side plates, the body frame is provided a connection device for connecting to a fishing rod.

The clamping adjustable device comprises a central shaft passing through said central hole of the fishing line spool and the bores of the side plates and a central shaft end surface abutting against one of the side plates of the body frame, the central shaft is provided with a threaded central hole, an adjustment screw is inserted through the bore of the other side plate of the body frame and screwed into the threaded central hole of the central shaft, to adjust the clamping degree on the fishing line spool by the two side plates of the body frame.

A positioning projection is extended from the central shaft end surface, and one of the side plates of the body frame is provided with a positioning slot engaging with the positioning projection.

The adjustment screw is provided with a grip part at an end surface thereof.

Friction pieces are provided between the contact surfaces of the central bore of the fishing line spool and the two side plates of the body frame.

The connection device for connecting to the fishing rod is a connection hook provided on the top of the body frame.

The advantages of the present invention are: the clamping adjustable device of the present invention is inserted through the central bore of the fishing line spool and the bores of the two side plates of the body frame to rotatably mount the fishing line spool between the two side plates of the body frame, after the body frame is connected with a fishing rod through the connection device, the clamping force applied on the fishing line spool by the two side plates can by adjusted by the clamping adjustable device. When the line in the fishing line spool is drawn by a fishing reel, the clamping force on the fishing line spool by the body frame will function as a brake against the rotation of the fishing line spool, and hence apply a constant tension on the fishing line, and a proper tightness can be uniformly maintained during introducing the fishing line into the fishing reel. Regardless of the material, thickness or the like of the line and the experience of the operator, the introducing of the fishing line can be independently and easily fulfilled, and the tightness of the introduced fishing line can be guaranteed, and thus the efficiency and the comfort for the subsequence operation can be improved.

BRIEF DESCRIPTION OF THE DRAWINGS

The present invention will be further described with reference to the attached drawings and the embodiments.

DETAILED DESCRIPTION OF THE PREFERRED EMBODIMENTS

Figure 1:
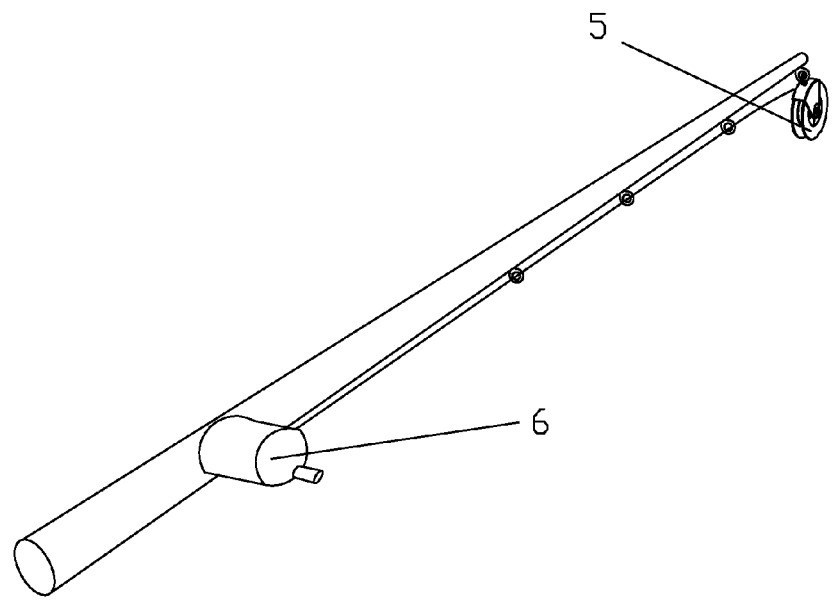
FIG. 1 shows the operation state of the invention when provided on a fishing rod.
Figure 2:
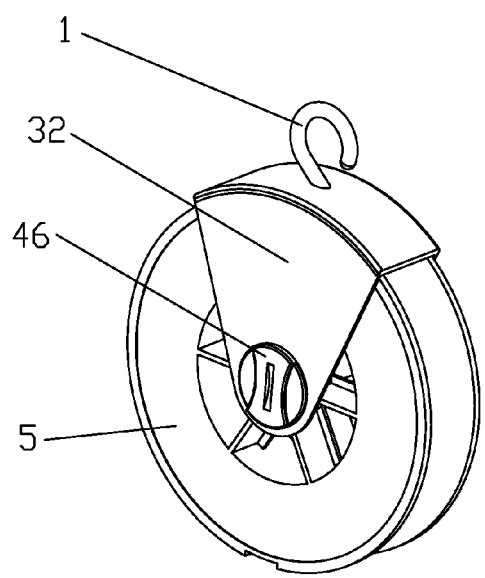
FIG. 2 is a schematic view showing the overall structure of one embodiment of the present invention.
Figure 3:
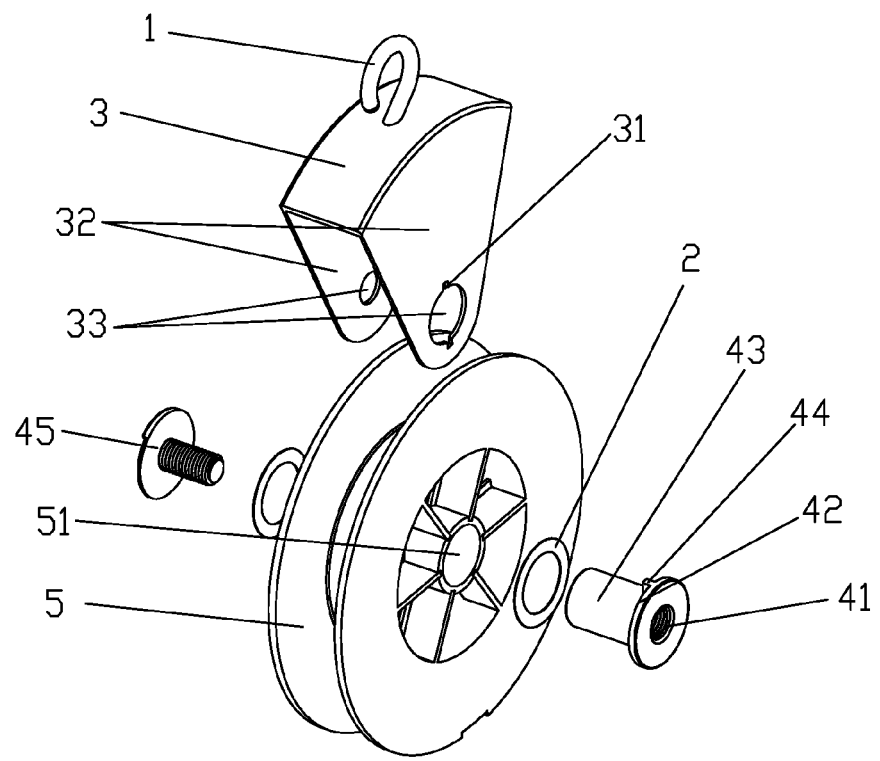
FIG. 3 is an explored view of FIG. 2.
Figure 4:
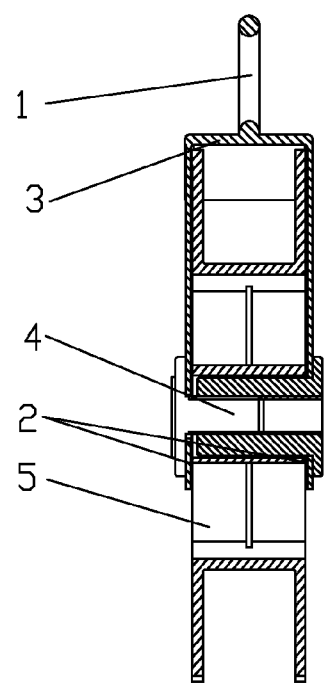
FIG. 4 is a cross-sectional view of FIG. 2.

Referring to FIGS. 1, 2, 3, and 4, a fishing line spool assembly comprises an open body frame 3, wherein a fishing line spool 5 is mounted between two side plates 32 of the body frame 3 at the open ends. The fishing line spool 5 has a central bore 51, and a clamping adjustable device 4 is inserted through the bore 51 and bores 33 in two side plates 32 of the body frame, so that the fishing line spool 5 is rotatably sandwiched between the two side plates 32 of the body frame. The body frame 3 is provided with a connection device 1 for connecting to a fishing rod.

According to the present invention, the clamping adjustable device 4 is inserted through the central bore 51 of the fishing line spool and the bores 33 of the two side plates 32 so that the fishing line spool 5 is rotatably sandwiched between the two side plates 32 of the body frame 3. After the body frame 3 is connected with the fishing rod through the connection device 1, the clamping force acted on the fishing line spool 5 by the body frame 3 can be adjusted by the clamping adjustable device 4. When the fishing line in the fishing line spool 5 is drawn by using a fishing reel 6, the clamping force acting on the fishing line spool by the body frame 3 will function as a brake against the rotation of the fishing line spool, thereby a constant tension is applied to the fishing line, so that the fishing line is kept with a proper and uniform tightness throughout the process of introducing the fishing line into the fishing reel 6. Regardless of the material, thickness or the like of the fishing line, and how the operator's experience, the introducing of the fishing line can be independently and easily performed, the tightness of the introduced fishing line can be guaranteed, and thus the efficiency and comfort of the subsequent operation can be improved.

The clamping adjustable device 4 may be designed in many ways, as an preferred embodiment of the present invention, the clamping adjustable device 4 includes a central shaft 43 passing through the central bore 51 and the bores 43 of the side plates and a central shaft end surface 42 abutted against one of the side plates of the main frame 3. The central shaft 43 is provided with a threaded central hole 41, and an adjustment screw 45 is inserted through the bore in the other side plate of the body frame and screwed into the threaded central hole 41, to adjust the clamping degree of the fishing line spool 5 by the two side plates 32 of the body frame.

Figure 5:
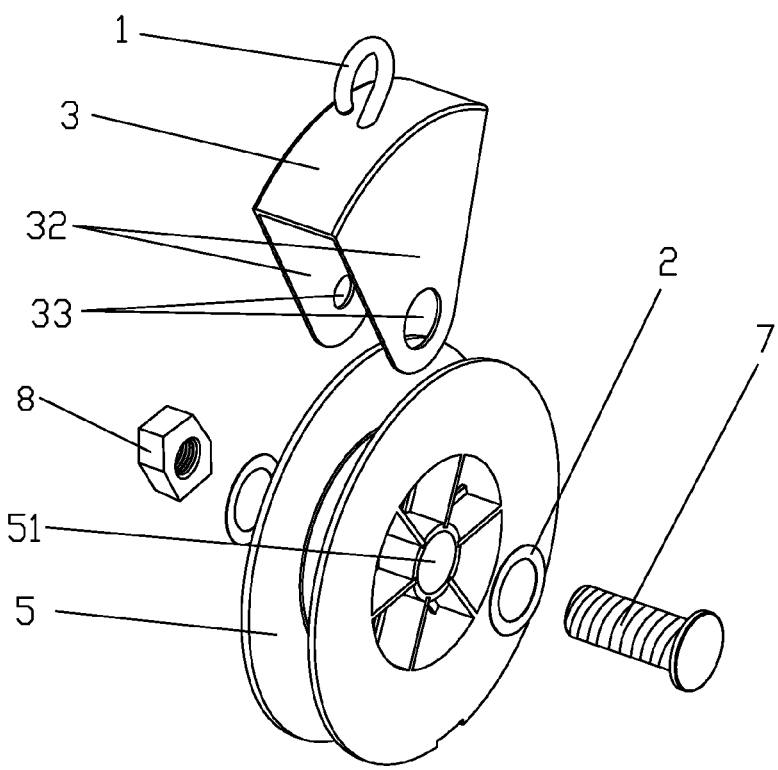
FIG. 5 is a schematic view of an another embodiment of the present invention.

Referring to FIG. 5, the clamping adjustable device may also employ a screw 7 which is inserted through the central bore 51, and fitted with a lock nut 8, so that the fishing line spool 5 is sandwiched between the two side plates 32 of the body frame. By adjusting the screw degree of the nut 8 on the screw 7, the clamping degree of the fishing line spool 5 by the two side plates of the body frame can be adjusted.

The above described examples are only the preferred embodiments of the present utility model, and will not limit the scope of the present utility model, as long as the object of the present invention is achieved by the substantially same technical means, it is intended to be within the scope of the invention.

Figure 6:
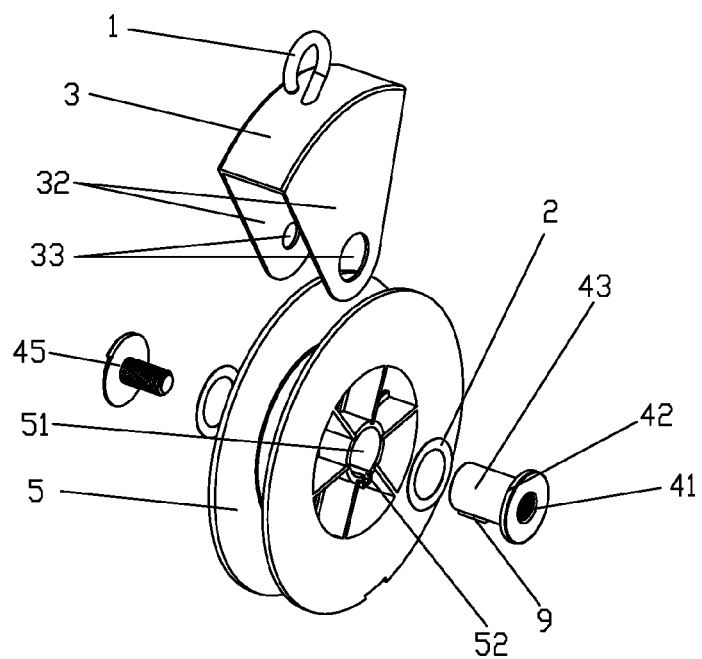
FIG. 6 is a schematic view of a third embodiment of the present invention.

A positioning projection 44 is extended from the central shaft end surface 42, and a positioning slot 31 matching with the positioning projection 44 is formed on one of the side plates of the body frame 3. When assembled, the positioning projection 44 is engaged into the positioning slot 31 formed on the bore of the side plate of the body frame 3, so that the central shaft is fixed with respect to the body frame 3, whereby the fishing line spool 5 is rotated around the central shaft 43 when the fishing line is drawn. Alternatively, referring to FIG. 6, a key 9 is provided on the central shaft 43, and a key slot 52 fitting with the key 9 is formed on the central bore 51. When assembled, the key 9 is engaged within the key slot 52 of the central bore 51, so that the central shaft 43 is fixed with respect to the fishing line spool 5, whereby the fishing line spool 5 is rotated together with the central shaft 43 around the bore 33 of the body frame 3 when the fishing line is drawn.

The adjustment screws 45 is provided with a grip part 46 at an end surface thereof to facilitate the operator adjust the tightening degree of the adjustment screw 45, to change the clamping force of the fishing line spool 5 by the body frame 3, and hence to control the tension applied on the fishing line when rotating the fishing reel 6.

In order to prevent the contact surfaces of the central bore 51 of the fishing line spool 5 and the two side plates of the body frame 3 from being wore and also in order to suitably generate friction therebetween, friction pieces 2 are provided on the both contact surfaces. When the fishing line loaded into the fishing line spool 5 is pulled by using the fishing reel 6, the friction pieces will act as a brake to the fishing line spool 5. After used for a long time, the friction pieces 2 need to be replaced, to guarantee the effect.

The body frame 3 is provided with a connection device for connecting to the fishing rod 1, so as to fix position of the body frame 3 on the fishing rod, instead of introducing the fishing line by grasping the fishing line spool by hand in the prior art. In this embodiment, the connecting device is a connecting hook provided at the top of body frame 3. By the connecting hook, the body frame 3 can be directly hanged on the guide ring of the fishing rod, not only taking the place of the hand for fixing the fishing line spool, but also utilizing the existed guide ring structure on the fishing rod, resulting in a convenient implementation.

The fishing line spool assembly according to the present invention has a simpler structure, is convenient to introduce the fishing line into the fishing reel, efficiently solve the problem of non-uniform tension in the prior art. With the present invention, the fishing line being such introduced has a proper tightness, and is easily operated.

What is claimed is:
1. A fishing line spool assembly comprising an open body frame, wherein a fishing line spool is mounted between two side plates of said body frame at an open end,
   wherein the fishing line spool has a central bore, and a clamping adjustable device is inserted through said central bore and bores in said two side plates such that the fishing line spool is rotatably sandwiched between said two side plates of said body frame, wherein said body frame is provided with a connection device for connecting to a fishing rod;

wherein said clamping adjustable device comprises a central shaft inserted through said central bore and said bores in said side plates and a central shaft end surface abutted against one of said side plates of said body frame, wherein said central shaft is provided with a threaded central hole, and wherein an adjustment screw is inserted through a bore in the other side plates of said body frame and screwed into said threaded central hole, to adjust clamping degree of said fishing line spool by said two side plates of said body frame;

wherein a positioning projection is extended from said central shaft end surface and a positioning slot fitting with said positioning projection is formed on one of said side plates of said body frame.

2. The fishing line spool assembly as claimed in claim 1, wherein said adjustment screw is provided with a grip on an end surface thereof.

3. The fishing line spool assembly as claimed in claim 1, wherein friction pieces are provided between contacting surfaces of said central bore of said fishing line spool and said two side plates of said body frame.

4. The fishing line spool assembly as claimed in claim 1, wherein said connection device for connecting to said fishing rod is a connecting hook provided on a top of said body frame.

\* \* \* \* \*